United States Patent
Lai et al.

(10) Patent No.: US 7,636,839 B2
(45) Date of Patent: Dec. 22, 2009

(54) METHOD, APPARATUS AND SYSTEM FOR PRE-BOOT NOTE DISPLAY

(75) Inventors: Soon Chong Lai, Kulim Kedah (MY); Yah Wen Ho, Penang (MY); David Siang Kong Ting, Penang (MY)

(73) Assignee: Intel Corporation, Santa Clara, CA (US)

( * ) Notice: Subject to any disclaimer, the term of this patent is extended or adjusted under 35 U.S.C. 154(b) by 522 days.

(21) Appl. No.: 11/490,646

(22) Filed: Jul. 21, 2006

(65) Prior Publication Data

US 2008/0046613 A1 Feb. 21, 2008

(51) Int. Cl.
 *G06F 3/00* (2006.01)
 *G06F 9/00* (2006.01)
(52) U.S. Cl. ................................ 713/1; 713/2; 715/700
(58) Field of Classification Search ...................... 713/1, 713/2; 715/700
See application file for complete search history.

(56) References Cited

U.S. PATENT DOCUMENTS

| | | | |
|---|---|---|---|
| 5,734,853 A * | 3/1998 | Hendricks et al. | 715/716 |
| 5,996,072 A * | 11/1999 | Noll et al. | 713/1 |
| 6,873,333 B1 * | 3/2005 | Patel et al. | 345/530 |
| 7,073,051 B2 * | 7/2006 | Touchet | 713/1 |
| 7,107,441 B2 * | 9/2006 | Zimmer et al. | 713/1 |
| 7,424,623 B2 * | 9/2008 | Du et al. | 713/300 |
| 7,506,144 B2 * | 3/2009 | Zhao et al. | 713/1 |
| 2002/0073305 A1 * | 6/2002 | Joseph et al. | 713/1 |

OTHER PUBLICATIONS

ABIT, BE6 User's Manual, Oct. 27, 2001, Rev. 1.01, chapt. 3.*

* cited by examiner

*Primary Examiner*—Mark Connolly
(74) *Attorney, Agent, or Firm*—Blakely, Sokoloff, Taylor & Zafman LLP (57) ABSTRACT

A computer having an operating system is connected to a first memory. The computer operates to execute an on screen display (OSD) program in a first memory and a basic input output system (BIOS) application in a second memory. The BIOS application operates to display user information from user information data stored in the second memory on a display before the computer's operating system is loaded. The OSD program operates to display user information from the user information data stored in the second memory on the display after the computer's operating system is loaded. A process determines if a user input is selected, reads a memory for user information data if the user input is selected, and displays user information on a display before an operating system is loaded.

20 Claims, 6 Drawing Sheets

METHOD, APPARATUS AND SYSTEM FOR PRE-BOOT NOTE DISPLAY

BACKGROUND

1. Field

The embodiments relate to displaying user information (i.e., notes) on a display, and in particular to displaying notes on a display before completing system boot of a device.

2. Description of the Related Art

Computer operating systems can take 30 seconds or more to boot, and are significantly delayed depending on the number of application loaded during the boot up sequence. Critical information, such as telephone conference call call-in numbers, pass codes, emergency information, etc., are usually stored in memory through applications (e.g., electronic mail (e-mail) applications, word processing applications, etc. To access the critical information, from the time the computer device is turned on, can take 2-3 minutes.

BRIEF DESCRIPTION OF THE DRAWINGS

The embodiments are illustrated by way of example, and not by way of limitation, in the figures of the accompanying drawings and in which like reference numerals refer to similar elements and in which.

DETAILED DESCRIPTION

The embodiments discussed herein generally relate to apparatus, system and method for displaying a graphical "sticky" note before system boot. Referring to the figures, exemplary embodiments will now be described. The exemplary embodiments are provided to illustrate the embodiments and should not be construed as limiting the scope of the embodiments.

Figure 1:
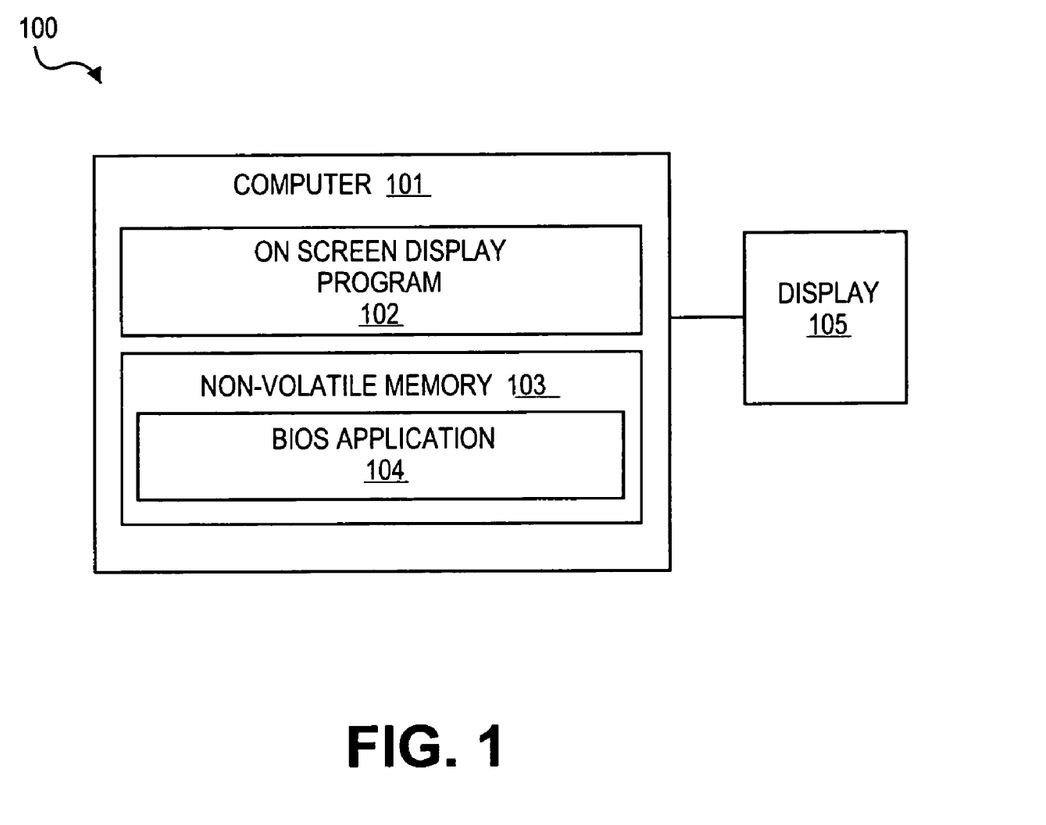
FIG. 1 illustrates an embodiment of an apparatus.

FIG. 1 is a diagram of one embodiment of a device utilizing a BIOS (basic input output system) application 104. Device 103 includes non-volatile memory 103. Device 100 may include, computers, handheld devices, personal digital assistants (PDAs), gaming devices, cellular phones, wireless devices, and other similar devices. Each device may include or execute a BIOS application 104. The BIOS application 104 may be a software application, firmware, an embedded program, hardware or similarly implemented program. The program may be stored in a non-volatile memory 103 or may be hardwired. In one embodiment, BIOS application 104 is an extensible firmware interface (EFI) application. BIOS application 104 operates as soon as device 100 is powered on. BIOS application 104 loads/stores information (e.g., a stored user note) from non-volatile memory 103 and displays the information on display 105.

Device 100 also includes on screen display program (OSD) 102 that stores user information to non-volatile memory 103, displays stored user information in non-volatile memory to display 105, erases user information from non-volatile memory 103. The information that is stored on non-volatile memory 103 is stored to a reserved block in non-volatile memory 103. The reserved block can be a 1K block, a 2K block etc. In one embodiment, OSD 102 interfaces with user application(s) 200, (e.g., e-mail programs, word processing programs, note taking programs, etc.) to allow a user to store note information provided to the user applications to the non-volatile memory 103.

In one embodiment, OSD program 104 displays a graphical user interface (GUI) notepad that allows a user to copy/cut and paste information from a user application into the notepad display. In one embodiment, the notepad, when invoked (e.g., via a hot key), first displays user information (if any) that was previously stored in the reserved block of non-volatile memory 103. The user can then delete all or part of the previously stored information or paste in the new information over the previously stored information or in the empty notepad. The user selects a save button on the GUI notepad and the information is loaded into the non-volatile memory 103. The user can also select a delete button on the GUI notepad and the stored information is erased from the reserved block.

Non-volatile memory 103 erasable programmable ROM (EPROM) also known as Flash memory, or other similar type of memory. In one embodiment, non-volatile memory 103 is disposed in a firmware hub (FWH). Computer 101 includes system memory, which can be local random access memory (RAM), static RAM (SRAM), dynamic RAM (DRAM), fast page mode DRAM (FPM DRAM), Extended Data Out DRAM (EDO DRAM), Burst EDO DRAM (BEDO DRAM), erasable programmable ROM (EPROM) also known as Flash memory, RDRAM® (Rambus® dynamic random access memory), SDRAM (synchronous dynamic random access memory), DDR (double data rate) SDRAM, DDRn (i.e., n=2, 3, 4, etc.), etc., and may also include a secondary memory (not shown).

The secondary memory may include, for example, a hard disk drive and/or a removable storage drive, representing a floppy disk drive, a magnetic tape drive, an optical disk drive, etc. The removable storage drive reads from and/or writes to a removable storage unit. The removable storage unit represents a floppy disk, magnetic tape, optical disk, etc., which is read by and written to by the removable storage drive. As will be appreciated, the removable storage unit may include a machine readable storage medium having stored therein computer software and/or data. The BIOS application may be used for communication with devices over a network 510 (see FIG. 5).

Device 100 may also include a communications interface (not shown). The communications interface allows software and data to be transferred between computer 101 and external devices (such as other devices 100). Examples of communications interfaces may include a modem, a network interface (such as an Ethernet card), a communications port, a PCM-CIA (personal computer memory card international association) slot and card, a wireless LAN interface, etc. Software and data transferred via the communications interface are in the form of signals which may be electronic, electromagnetic, optical or other signals capable of being received by the communications interface. These signals are provided to the communications interface via a communications path (i.e., channel). The channel carries the signals and may be implemented using wire or cable, fiber optics, a phone line, a cellular phone link, a wireless link, and other communications channels.

In alternative embodiments, the secondary memory may include other ways to allow computer programs or other instructions to be loaded into device 101, for example, a removable storage unit and an interface. Examples may include a program cartridge and cartridge interface (such as that found in video game devices), a removable memory chip or card (such as an EPROM (erasable programmable read-only memory), PROM (programmable read-only memory), or flash memory) and associated socket, and other removable storage units and interfaces which allow software and data to be transferred from the removable storage unit to device 101.

In this document, the term "computer program product" may refer to the removable storage units, and signals. These computer program products allow software to be provided to device 101. Embodiments of the invention may be directed to such computer program products. Computer programs (also called computer control logic) are stored in system memory, and/or the secondary memory and/or in computer program products. Computer programs may also be received via the communications interface. Such computer programs, when executed, enable device 101 to perform features of embodiments of the present invention as discussed herein. In particular, the computer programs, when executed, enable computer 101 to perform the features of embodiments of the present invention. Such features may represent parts or the entire blocks of process 400 illustrated in FIG. 4. Alternatively, such computer programs may represent controllers of computer 101.

In an embodiment where the invention is implemented using software, the software may be stored in a computer program product and loaded into device 101 using the removable storage drive, a hard drive or a communications interface. The control logic (software), when executed by computer 101, causes computer 101 to perform functions described herein.

Computer 101 includes a display 105 for displaying a user note previously stored in non-volatile memory 103 and an OSD from OSD program 102. Display 105 also displays various application graphical user interfaces (GUIs) and user displays. The display can be an analog electronic display, a digital electronic display a vacuum fluorescent (VF) display, a light emitting diode (LED) display, a plasma display (PDP), a liquid crystal display (LCD), a high performance addressing (HPA) display, a thin-film transistor (TFT) display, an organic LED (OLED) display, a heads-up display (HUD), etc. Computer 101 includes a display memory buffer (not shown) for storing information to be displayed on display 105.

In another embodiment, the invention is implemented primarily in hardware using, for example, hardware components such as application specific integrated circuits (ASICs) using hardware state machine(s) to perform the functions described herein. In yet another embodiment, the invention is implemented using a combination of both hardware and software.

Figure 2:
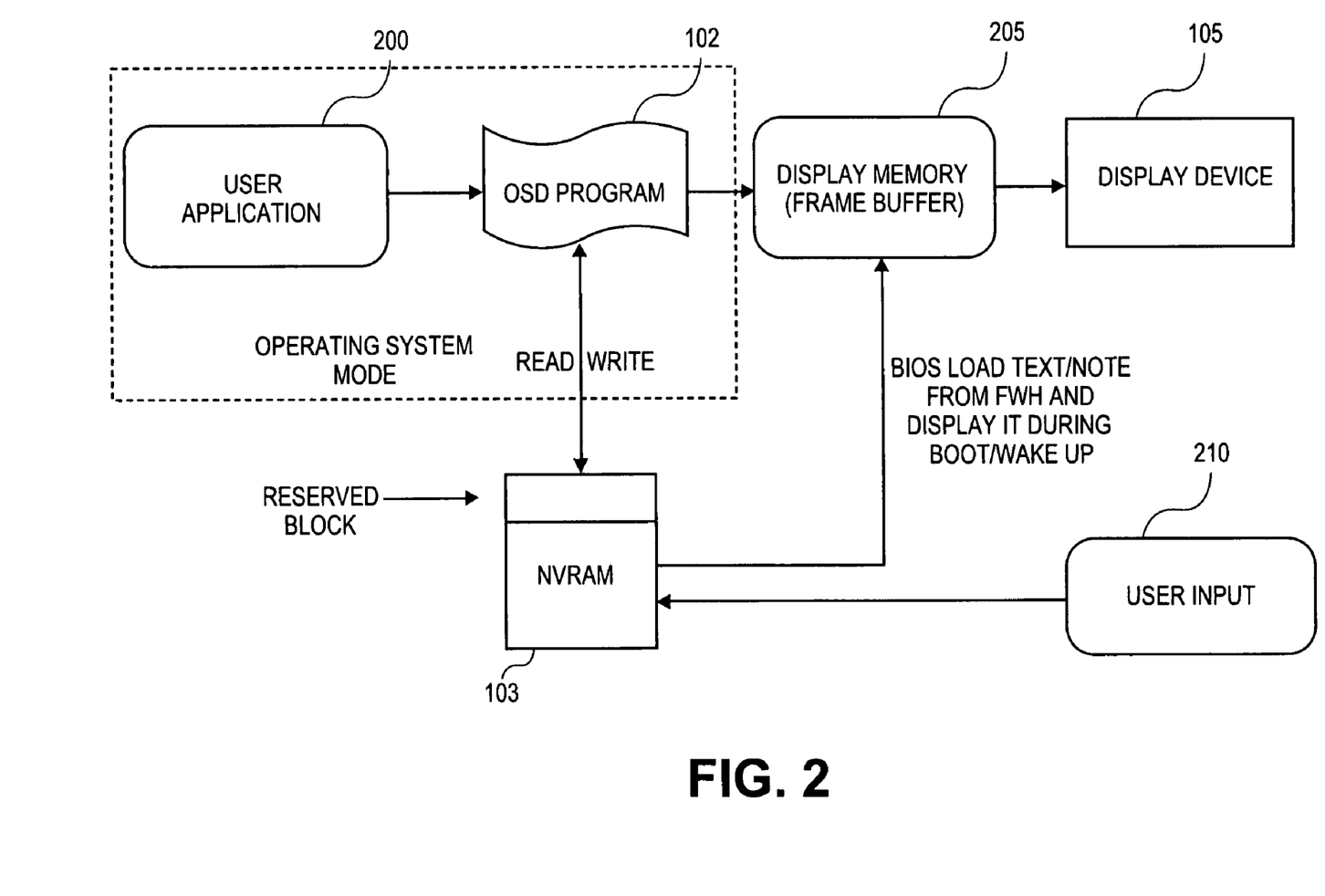
FIG. 2 illustrates a data flow diagram for an embodiment.

FIG. 2 illustrates data flow from non-volatile memory 103 to display 105. When device 100 is powered on, BIOS application 104 is executed and runs in the background. In one embodiment during device 100 boot, BIOS application 104 checks for a user input 210 (e.g., pressing of a hot key, such as a function key on a keyboard (i.e., F11, F12, etc.)). In this embodiment, if the user input 210 is detected, information stored in non-volatile memory 103 is loaded into a frame buffer 205 of display 105. From the display buffer 205, the user note information is then displayed on display 105. Therefore, important user information (e.g., meeting reminder, telephone conference call in number, etc.) can be displayed immediately upon power on of device 100. The user, therefore, does not have to wait for complete loading of the operating system, execution of start-up programs and execution and displaying the information on a user application 200.

In another embodiment, BIOS application 104 checks for information stored in the reserved block in non-volatile memory 103. If there is information stored in the reserved block in non-volatile memory 103, the information is loaded into the frame buffer 205 of display 105 and displayed on display 105 until a hot key is detected by BIOS application 104. In still another embodiment, if information is detected in the reserved block in non-volatile memory 103, the information is loaded into the frame buffer 205 of display 105 and then displayed for a user selected predetermined time (e.g., 30 sec., 1 min., etc.).

The OSD program 102 runs in the background upon complete booting of an operating system and startup applications. It should be noted that upon complete booting of the operating system on device 100, the frame buffer may be cleared (dependent on the operating system used). The OSD program 102 re-loads the frame buffer with the user information and displays the user information on display 105 if necessary. OSD program 102 allows a user to enter information through a user interface (e.g., a key board, keys, etc.), which will then be stored in non-volatile memory 103.

As illustrated, a user can select information (e.g., telephone numbers, appointment information, meetings, etc.) from user application 200. The information is input into OSD program 102. OSD program 102 loads to/reads from non-volatile memory 103. If the user selects to display the user information on display 105, the OSD program 102 loads the user information into the frame buffer 205. The user information is then displayed on display 105.

Figure 3A:
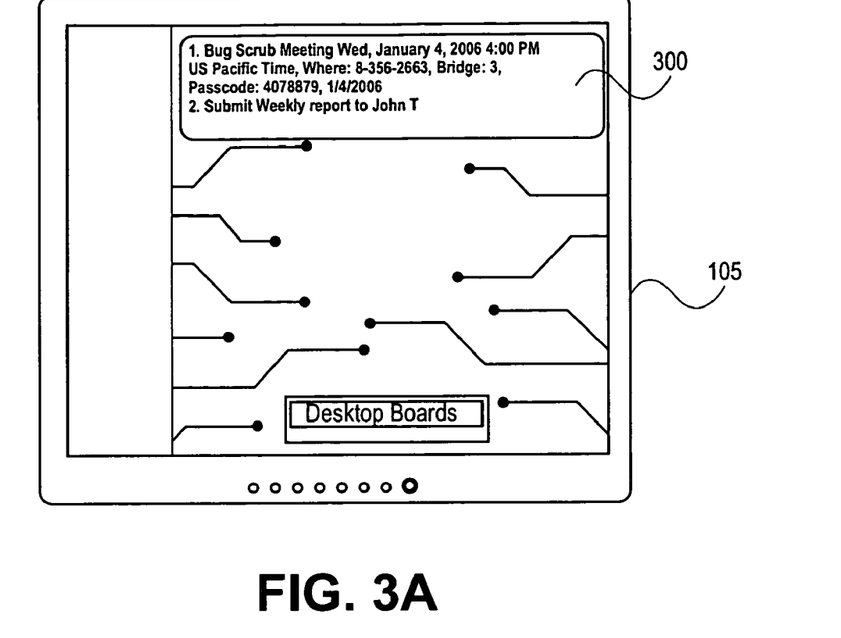
FIG. 3A-C illustrate example notes for an embodiment.

FIG. 3A illustrates a pre-boot page on display 105. In this embodiment, the page is when a user has not yet logged on to the operating system. To read information in a user application 200, a user would need to enter login information and wait for the operating system to load all the start-up programs before accessing a user application 200. As illustrated, user information 300 is displayed on display 105 before a user is logged in, start-up programs are executed and a user application 200 is accessed. In one embodiment, the specifics of the user information screen are pre-selected by a user. The specifics may include flashing display or non-flashing display, color, size of screen, size of text, etc.

Figure 3B:
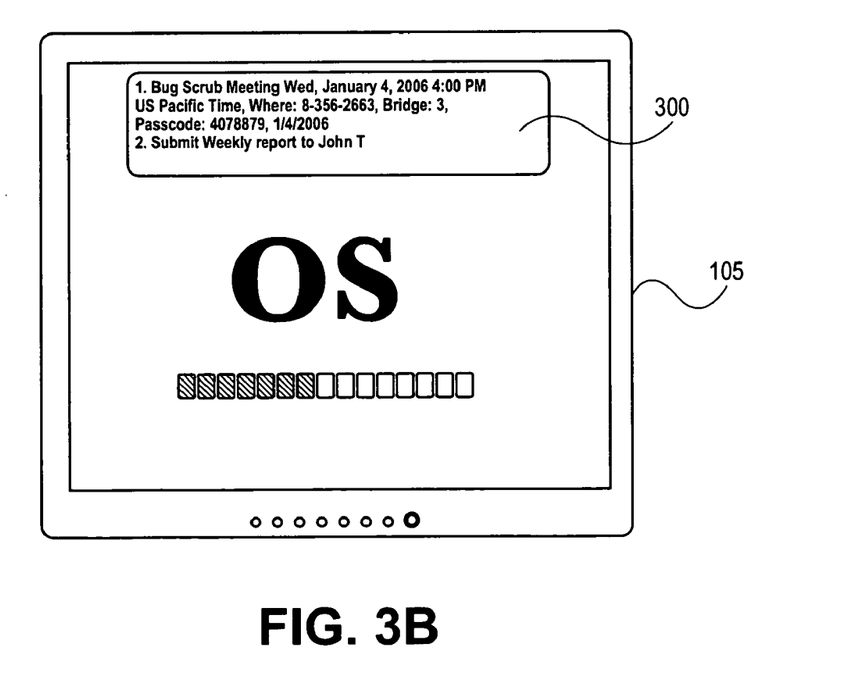
Figure 3C:
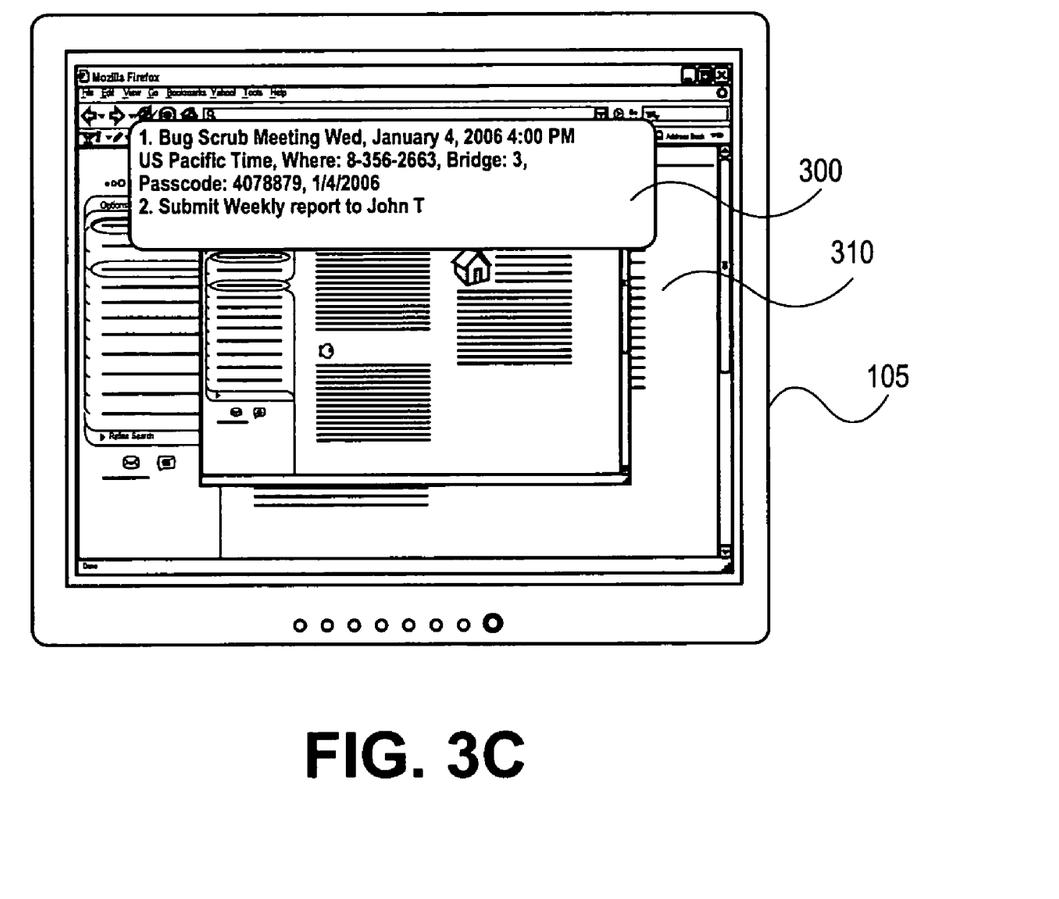

FIG. 3B illustrates display 105 showing an operating system in the process of loading. As illustrated, user information 300 is displayed before device 100 is completely booted. FIG. 3C illustrates a GUI of a user application 200 displayed on display 105. In this case, user information 300 is overlaid on the GUI. In one embodiment, even if the operating system has an error, a problem (e.g., a virus, worm, critical error, etc.) or crashes, user information 300 may still be displayed as user information 300 is processed by the BIOS, not the operating system.

Figure 4:
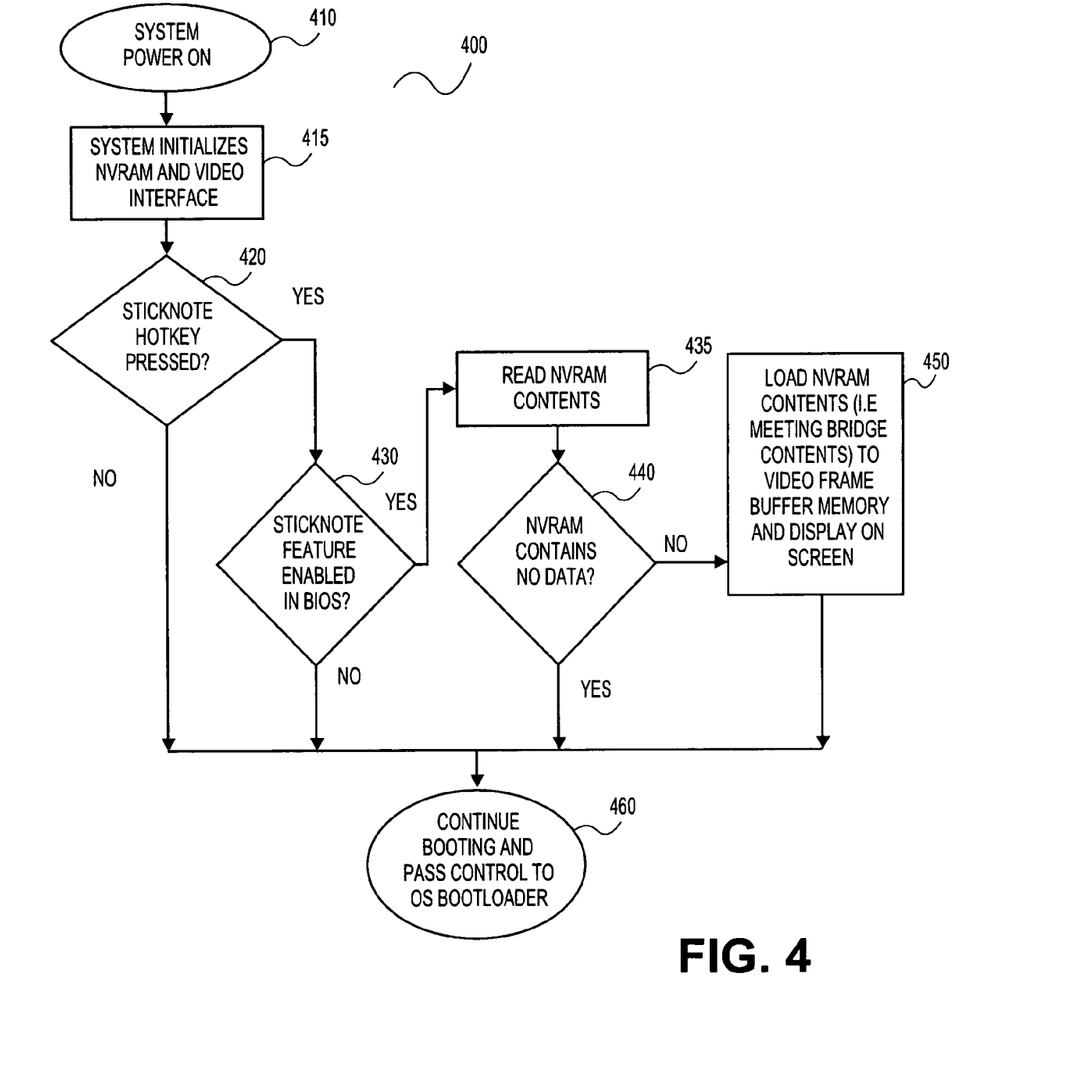
FIG. 4 illustrates a block diagram of an embodiment.

FIG. 4 illustrates a block diagram of a process for an embodiment. Process 400 starts when device 100 is powered on in block 410. In block 415, non-volatile memory 102 and the video device interface to display 105 (including frame buffer 205) is initialized by device 100. BIOS application 104 is executed. In this embodiment, in block 420 it is determined if a user input (i.e., a hot key) is selected by a user. In this block, BIOS application either waits to receive an interrupt or polls for the signal from the hot key being pressed. If block 420 determines that a hot key has not been pressed by a user, process 400 continues with block 460, where device 100 continues booting and then passes control over to the operating system boot loader.

If block 420 determines that a hot key was selected by a user (or in another embodiment, automatically sets a hot key signal for a predetermined time), process 400 continues with block 430. In block 430 it is determined whether the user information feature is enabled in the BIOS. In this embodiment, a user can pre-select whether to allow the user information feature to be enabled or disabled. If it is determined in block 430 that the user information feature is not enabled in the BIOS, process 400 continues with block 460. If it is determined in block 430 that the user information feature is enabled in the BIOS, process 400 continues with block 435.

In block 435, BIOS application 104 reads the contents of the reserved block of non-volatile memory 103 (whether user information exists or not). Process 400 continues with block 440. In block 440, it is determined whether the non-volatile memory 103 contains date or not. If it is determined that no user information data exists in non-volatile memory 103, process 400 continues with block 460.

If it is determined that user information data exists in non-volatile memory 103, process 400 continues with block 450. In block 450, the contents in the reserved block of non-volatile memory 103 is loaded to frame buffer 205 and then displayed on display 105. Process then continues with block 460.

Figure 5:
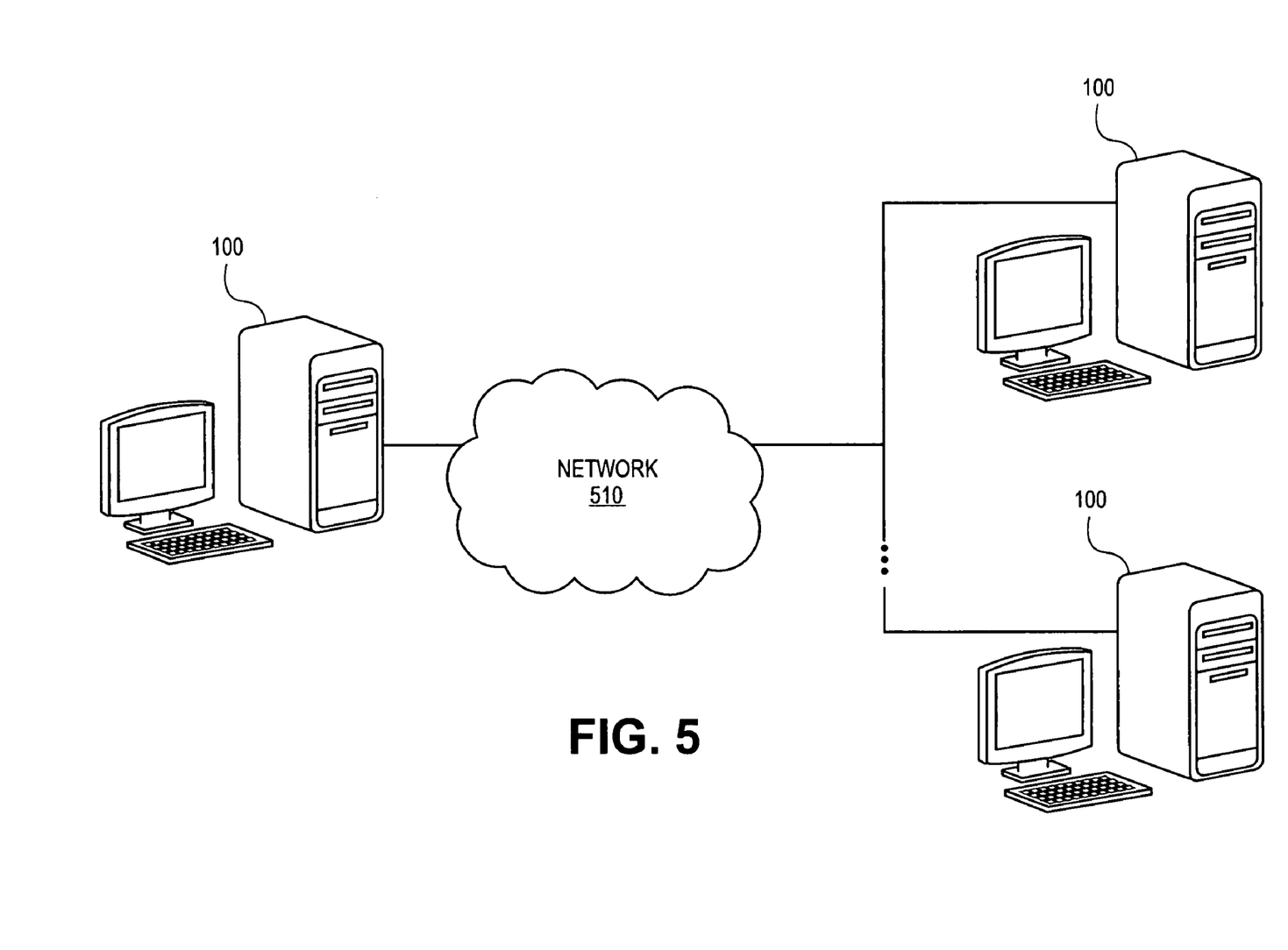
FIG. 5 illustrates an embodiment of a system.

FIG. 5 illustrates a system including many devices 100 connected via a network 510. Network 510 can be wired or wireless. The network 510 may be a local area network (LAN), wide area network (WAN) or similar network. The network 510 may utilize any communication medium or protocol. In one example embodiment, the network 510 may be the Internet. In another embodiment, the devices may communicate over a direct link including wireless direct communications.

In this embodiment, users can select certain devices 100 that can receive a hotkey signal over the network. In this embodiment, one device 100 can have a hot key pressed. The BIOS application then sends the hotkey signal over the network to all of the devices 100. The user information is displayed on all of the device(s) 100 that enable the BIOS application 104 and/or OSD program 102 to accept a hot key signal from the sending device 100. If the device(s) 100 accept the hot key signal, the user information is sent to the device(s) 100, stored in non-volatile memory 103, and displayed on the display 105. In this embodiment, even if the device(s) 100 are in a logged out state, the user information will be displayed (i.e., overlaid) on the log-in screen. When all device(s) 100 are completely booted, the user information is displayed over whatever screen the user may have up on display 105.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known circuits, structures and techniques have not been shown in detail to avoid obscuring the understanding of this description.

Embodiments of the present disclosure described herein may be implemented in circuitry, which includes hardwired circuitry, digital circuitry, analog circuitry, programmable circuitry, and so forth. These embodiments may also be implemented in computer programs. Such computer programs may be coded in a high level procedural or object oriented programming language. The program(s), however, can be implemented in assembly or machine language if desired. The language may be compiled or interpreted. Additionally, these techniques may be used in a wide variety of networking environments. Such computer programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the disclosure may also be considered to be implemented as a machine-readable or machine recordable storage medium, configured for use with a processing system, where the storage medium so configured causes the processing system to operate in a specific and predefined manner to perform the functions described herein.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

What is claimed is:

1. A method of operating a device, comprising:
   determining if a user input is detected;
   reading a non-volatile memory for personal user information data because the user input is detected; and
   displaying the personal user information on a display before an operating system of the device is loaded.

2. The method of claim 1, further comprising executing a basic input output system (BIOS) application from the non-volatile memory upon power on of the device to perform the determining and the reading.

3. The method of claim 2, further comprising:
   after powering down and then again powering on the device, completing loading of the operating system without reading the personal user information from the non-volatile memory because the user input is not detected; and
   executing an on screen display (OSD) program, wherein the OSD program runs in a background of the device.

4. The method of claim 2, further comprising:
   after powering down and then again powering on the device, determining if the user input is detected;
   reading the non-volatile memory for the personal user information data because the user input is detected; and
   displaying the user information on the display over other application screens.

5. The method of claim 4, wherein an OSD program operates to control erasing a reserved block in the memory and writing data to the reserved block in the memory.

6. An apparatus comprising:
   a computer having stored operating system program code and a first memory, the computer to execute an on screen display (OSD) program from the first memory and a basic input output system (BIOS) application from a second memory, wherein the BIOS application operates to display user information from user information data stored in the second memory on a display before the computer's operating system is loaded, and the OSD program operates to display user information from the user information data stored in the second memory on the display after the computer's operating system is loaded.

7. The apparatus of claim 6, wherein the second memory is a non-volatile memory.

8. The apparatus of claim 6, wherein the computer is one of a personal digital assistant (PDA), a cellular telephone and a gaming device.

9. A machine-readable storage medium containing instructions that, when executed, cause a machine to:
   determine if a user input is detected;
   read a non-volatile memory for personal user information data because the user input is detected; and
   display the personal user information on a display before an operating system of the device is loaded.

10. The machine-readable storage medium of claim 9, further containing instructions that, when executed, cause the machine to:
    execute a basic input output system (BIOS) application from the non-volatile memory upon power on of the device to perform the determining and the reading.

11. The machine-readable storage medium of claim 10, further containing instructions that, when executed, cause the machine to:
    after powering down and then again powering on the device, complete loading of the operating system without reading the personal user information from the non-volatile memory because the user input is not detected; and
    execute an on screen display (OSD) program, wherein the OSD program runs in a background of the device.

12. The machine-readable storage medium of claim 10, further containing instructions that, when executed, cause the machine to:
    after powering down and then again powering on the device, determine if the user input is detected;
    read the non-volatile memory for the personal user information data because the user input is detected; and
    display the user information on the display.

13. The machine-readable storage medium of claim 12, wherein an OSD program operates to control erasing a reserved block in the non-volatile memory and writing data to the reserved block in the non-volatile memory.

14. A system comprising:
    at least two computers each having an operating system coupled to a network, each computer having a respective first memory and a respective second memory, each computer operating to execute a respective on screen display (OSD) program from its first memory and a basic input output system (BIOS) application from its second memory,
    wherein the first computer operates to transfer user information data from its second memory over the network to the second computer to display user information on the second computer, and the user information stored on the first computer is displayed before its operating system is loaded.

15. The system of claim 14, wherein the network is one of wired and wireless.

16. The system of claim 14, wherein the second computer is one of a personal digital assistant (PDA), a cellular telephone and a gaming console.

17. The system of claim 14, wherein each second memory is a non-volatile memory.

18. The system of claim 14, wherein the first computer operates to transfer user information data from its second memory over the network to the second computer to display user information on the second computer, and the user information is displayed on the second computer before its operating system is loaded.

19. The system of claim 14, wherein the user information is displayed upon detection of a user input.

20. The system of claim 14, wherein the user information is displayed for a preselected duration.

* * * * *